United States Patent
Anslot et al.

(10) Patent No.: US 11,336,445 B2
(45) Date of Patent: May 17, 2022

(54) METHOD FOR UPDATING A ONE-TIME SECRET KEY

(71) Applicant: THALES DIS FRANCE SA, Meudon (FR)

(72) Inventors: Michel Anslot, Meudon (FR); Francis D'Souza, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 16/958,327

(22) PCT Filed: Dec. 10, 2018

(86) PCT No.: PCT/EP2018/084212
§ 371 (c)(1),
(2) Date: Jun. 26, 2020

(87) PCT Pub. No.: WO2019/129481
PCT Pub. Date: Jul. 4, 2019

(65) Prior Publication Data
US 2021/0058250 A1    Feb. 25, 2021

(30) Foreign Application Priority Data
Dec. 27, 2017  (EP) .................................. 17306942

(51) Int. Cl.
*H04L 9/08*    (2006.01)
*H04W 12/71*   (2021.01)
(Continued)

(52) U.S. Cl.
CPC .......... *H04L 9/0891* (2013.01); *H04L 9/3228* (2013.01); *H04L 9/3271* (2013.01);
(Continued)

(58) Field of Classification Search
CPC ....... H04L 9/0891; H04L 63/062; H04L 9/08; H04L 9/3228; H04L 9/3271; H04W 12/71; H04W 12/041; H04W 12/06
See application file for complete search history.

(56) References Cited

U.S. PATENT DOCUMENTS

| | | | |
|---|---|---|---|
| 10,420,055 B2 | 9/2019 | Zhang et al. | |
| 2004/0078571 A1* | 4/2004 | Haverinen | H04W 12/03 713/168 |

(Continued)

FOREIGN PATENT DOCUMENTS

EP    1768426 A1    3/2007

OTHER PUBLICATIONS

PCT/EP2018/084212, International Search Report, Jan. 7, 2019, European Patent Office, P.B 5818 Patentlaan 2 NL—2280 HV Rijswijk.

(Continued)

*Primary Examiner* — Izunna Okeke
(74) *Attorney, Agent, or Firm* — The Jansson Firm; Pehr B. Jansson (57) ABSTRACT

This invention relates to a method for updating a one-time secret key Kn maintained in a subscription module implemented in a communication apparatus, a wireless communication network maintaining an identical version of said one-time secret key Kn and configured to determine a result XRES expected from the communication apparatus when an authentication function is applied by the subscription module using a random challenge and said one-time secret key Kn as an input, the method comprising the following steps: receiving from the communication network an authentication request message containing at least a random challenge RANDn; determining by the subscription module a result RES by applying the authentication function using the random number RANDn and the one-time secret key Kn as (Continued)

inputs; transmitting said result RES to the communication network for it to be compared with the expected result XRES determined by the communication network using the random number RANDn and the corresponding version of the one-time secret key Kn, the subscriber being authenticated if said first and second results are matching; updating the one-time secret key Kn by replacing its current version with a new version obtained by applying a first key derivation function using the random challenge RANDn as an input, the updated version of the one-time secret key Kn being used by the subscription module for processing a subsequent authentication request, the same update being carried out by a server accessible or part of the wireless communication network in order to maintain an identical version of the one-time secret key Kn.

12 Claims, 2 Drawing Sheets

(51) Int. Cl.
*H04W 12/041* (2021.01)
*H04L 9/32* (2006.01)
*H04W 12/06* (2021.01)

(52) U.S. Cl.
CPC ......... *H04W 12/041* (2021.01); *H04W 12/06* (2013.01); *H04W 12/71* (2021.01)

(56) References Cited

U.S. PATENT DOCUMENTS

| | | |
|---|---|---|
| 2007/0160201 A1* | 7/2007 | Blom .................... H04L 9/0891 380/30 |
| 2012/0108205 A1 | 5/2012 | Schell et al. |
| 2014/0087790 A1 | 3/2014 | Babbage et al. |
| 2016/0164673 A1* | 6/2016 | Grimault ............... H04L 9/0816 380/44 |

OTHER PUBLICATIONS

PCT/EP2018/084212, Written Opinion of the International Searching Authority, Jan. 7, 2019, European Patent Office, D-80298 Munich.

* cited by examiner

METHOD FOR UPDATING A ONE-TIME SECRET KEY

TECHNICAL FIELD

The present invention relates to a. It is applicable to the technical domain subscription modules implemented in hardware and/or software.

BACKGROUND OF THE INVENTION

A Subscriber Identity Module (SIM) is an application providing secure, identifiable and authenticated access to mobile networks. Since its inception in the early 1990's to the present day, it is implemented as a smart card which provides secure, identifiable and authenticated access to mobile networks. This smart card is designated as a SIM card when containing the SIM application and more generally as a universal integrated-circuit card (UICC). A UICC is able to contain several applications for example a SIM application, a universal subscriber identity module application (USIM). The UICC is also the primary piece of operator supplied equipment used by consumers when connecting to the mobile network.

The subscriber module SIM will need to continue to provide secure access to mobile operator networks.

All the personalization of a UICC card comprising one or several subscriber module is performed in factory leading to a duration of several seconds. Moreover all the orders coming from operators must contain several information which are written in the UICC cards, in particular:
  The Integrated Circuit Card Identifier (ICCID) which is an identifier of the SIM card;
  The International Mobile Subscriber Identity (IMSI) which is used to identify a subscriber;
  Security keys, in particular the Ki key, over-the-air (OTA) key, the personal unlocking key (PUK), the OPc which is a ciphered version of the operator key OP using Ki.

There are now alternatives to the UICC cards implementing one or several subscription modules. These are designated as virtual SIM (vSIM) or software SIM (softSIM) where the functionalities of the one or several subscription modules are carried out by a software layer. A traditional UICC card is tamper resistant by definition but a virtual SIM do not have this property without costly environment. If the credentials are extracted from the virtual SIM, clones can be easily generated.

Therefore, there is a need for a technology which is lowering the consequences of the cloning of a subscriber module.

SUMMARY OF THE INVENTION

This invention related to a method for updating a one-time secret key Kn maintained in a subscription module implemented in a communication apparatus, a wireless communication network maintaining an identical version of said one-time secret key Kn and configured to determine a result XRES expected from the communication apparatus when an authentication function is applied by the subscription module using a random challenge and said one-time secret key Kn as an input, the method comprising the following steps:
  receiving from the communication network an authentication request message containing at least a random challenge RANDn;
  determining by the subscription module a result RES by applying the authentication function using the random number RANDn and the one-time secret key Kn as inputs;
  transmitting said result RES to the communication network for it to be compared with the expected result XRES determined by the communication network using the random number RANDn and the corresponding version of the one-time secret key Kn, the subscriber being authenticated if said first and second results are matching;
  after each successful authentication of the subscriber, updating the one-time secret key Kn by replacing its current version with a new version obtained by applying a first key derivation function using the random challenge RANDn as an input, the updated version of the one-time secret key Kn being used by the subscription module or processing a subsequent authentication request, the same update being carried out by a server accessible or part of the wireless communication network in order to maintain an identical version of the one-time secret key Kn.

According to an example, a secret key called diversification key DK is memorized by the communication apparatus and used as an input by the first key derivation function in order to determine the one-time secret key Kn.

According to an example, an identifier of the communication apparatus such as the IMEI is memorized by the communication apparatus and used as an input by the first key derivation function in order to determine the one-time secret key Kn.

According to an example, an identifier of the subscriber of IMSI type memorized by the subscription module and used as an input by the first key derivation function in order to determine the one-time secret key Kn.

According to an example, the initial version K_0 of the one-time secret key Kn is initialized using a second key derivation function using as an input a random seed received from and determined by the communication network.

The invention also relates to a subscription module implemented in a communication apparatus configured to maintain and update a one-time secret key Kn, a wireless communication network maintaining an identical version of said one-time secret key Kn and configured to determine a result XRES expected from the communication apparatus when an authentication function is applied by the subscription module using a random challenge and said one-time secret key Kn as an input, the subscription module being further configure to:
  receive from the communication network an authentication request message containing at least a random challenge RANDn;
  determine a result RES by applying the authentication function using the random number RANDn and the one-time secret key Kn as inputs;
  transmit said result RES to the communication network for it to be compared with the expected result XRES determined by the communication network using the random number RANDn and the corresponding version of the one-time secret key Kn, the subscriber being authenticated if said first and second results are matching;
  update the one-time secret key Kn after each successful authentication of the subscriber by replacing its current version with a new version obtained by applying a first key derivation function using the random challenge RANDn as an input, the updated version of the one-time secret key Kn being used by the subscription module for processing a subsequent authentication request, the same update being carried out by a server accessible or part of the communication network in order to maintain an identical version of the one-time secret key Kn.

According to an example, the subscription module is an embedded universal integrated-circuit card (eUICC).

According to another example, the subscription module is a universal integrated-circuit card (UICC).

According to an example, the subscription module is implemented in a software program localized in the communication apparatus.

The invention also relates to a communication apparatus embedding a subscription module as described above.

The invention also relates to a server adapted to cooperate with a wireless communication network, to memorize a one-time secret key Kn associated to a subscriber and for updating it after a successful authentication of the subscriber owning a communication apparatus as described above, the successful authentication process involving a random challenge RANDn transmitted by the wireless communication network to the communication apparatus, the one-time secret key Kn being updated after each successful authentication of the subscriber by replacing its current version with a new version obtained by applying a first key derivation function using as an input the random challenge RANDn.

The invention also relates to a computer program product comprising instructions which, when the program is executed by a computer, cause the computer to carry out the steps of the method described above.

The invention also relates to a computer-readable storage medium comprising instructions which, when executed by a computer, cause the computer to carry out the steps of the method described above.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

Figure 1:
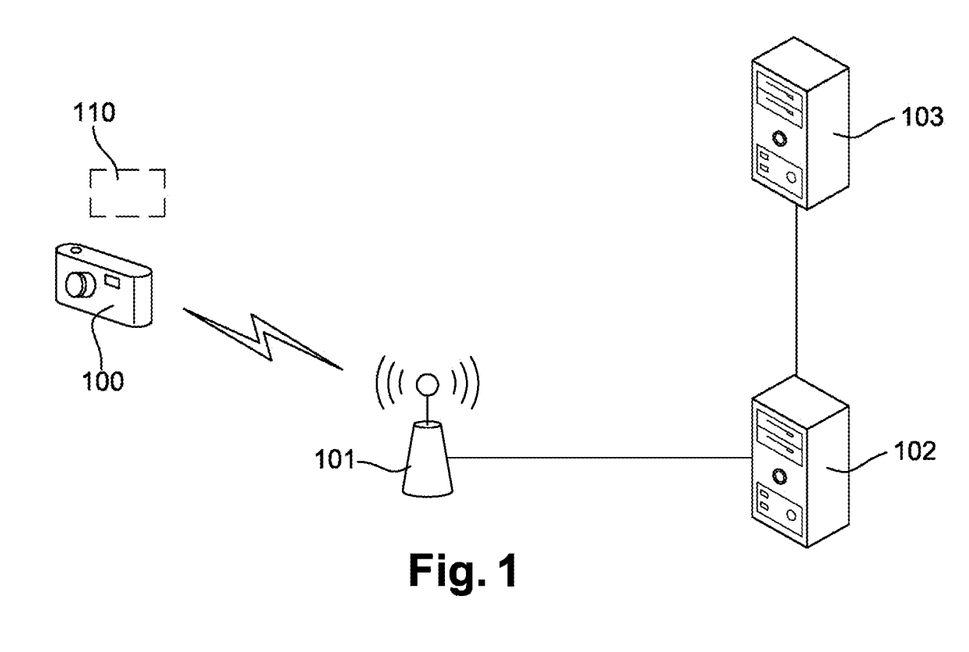
FIG. 1 is an example of a system implementing an authentication mechanism based on the use of a one-time secret key.

FIG. 1 is an example of a system implementing an authentication mechanism based on the use of a one-time secret key.

The system comprises a communication apparatus 100, that is to say a piece of equipment with communication capabilities and when needed, capacity of data capture, sensing, data storage, sensing and/or data processing.

The communication apparatus is for example a smartphone, a tablet computer or an IoT device. In this description, the expression IoT device refers to a piece of equipment with communication capabilities and optionally capacity of data capture, sensing, data storage, sensing and/or data processing. An IoT device comprises for example a wireless communication module also called Machine Type Communication (MTC) module allowing transmission of data from one IoT device to another or exchange of data between machines through UMTS/HSDPA, CDMA/EVDO, LTE, 5G, LoRa or other networks.

The communication apparatus embeds a subscription module 110. A subscription module is an entity implemented in software and/or hardware and comprising at least means for authenticating a subscriber in a communication network. The subscription module can be for example a Universal Integrated Circuit Card (UICC) comprising a SIM and a USIM application, a eUICC adapted to be provisioned with one or several subscription profile or a software SIM.

The subscription module memorizes a secret key which can be used only one time for authenticating the subscriber. In this description, when it is said that the one-time key is memorized in the subscriber module, this means:
  in case the subscriber module is implemented using an hardware platform such as a UICC or a eUICC, that the one-time-key Kn is maintained in a physical memory which is part of said hardware platform;
  in case the subscriber module is implemented as a purely software module such as a softSIM, this means the one-time-key Kn is memorized in the memory of the communication apparatus to which it is associated.

The system also comprises network elements 101, 102 which can be for example a eNode B 101 and an mobility management entity (MME) 102 is the communication technology is LTE (Long Term Evolution). The skilled person will appreciate that the invention is also applicable to other types of wireless technologies such as 2G, UMTS or 5G.

Another server 103 is represented and able to communicate with the MME 102 and the communication apparatus 100 embedding the subscription module 110. It is configured to memorize and update the same one-time secret key as the one memorized in the subscription module. This server is called in the sequel SKMAuC and be operated by a trusted third party which is different for the mobile network operator owning the subscription. It can work in parallel with a server such as a Home Subscriber Server (HSS). Alternatively, its functions can be integrated in the HSS of the mobile network operator owning the subscription or in a proxy server (D-HSS) configured to process the attachment requests transmitted by the communication apparatus.

A secret key Kn is memorized by the subscription module and by the communication network. It is used for authenticating a subscriber having a communication apparatus equipped with the subscription module. One key aspect of the invention is that the secret key Kn is updated after each successful authentication of the subscriber by the wireless communication network and by the subscription module 110. The same version of Kn is memorized on both sides for the authentication process to be carried out. The authentication process is based on transmitting by the wireless communication network to the communication apparatus 100 embedding the subscription module 110 a random challenge RAND. This random challenge RAND is used by the subscription module to determine a result RES using the current version of Kn and provide it to the network for being compared with an expected result XRES. If the expected result XRES is identical to the one calculated by the subscription module, the subscriber is authenticated. Then the random challenge RAND is used as an input by a key derivation function in order to generate the next version of the secret key Kn that will be used for the next authentication attempt.

Advantageously, if a subscription module and/or the communication apparatus embedding the subscription module is cloned by a fraudster to access to a given communication network, this will be detected. Authentication failures of the cloned device or the legitimate user will be detected as the one-time secret key Kn maintained by the cloned and the legitimate subscription module user will diverge after the first successful authentication following the cloning. In that case, the legitimate user can be requested by the mobile network operator to provide a secret credential in order to implement a further layer of authentication and the subscription module embedded in the communication apparatus hold by the legitimate user can be updated accordingly. Advantageously, the cloned subscription will be barred from the network knowing the non-valid one-time secret key Kn.

According to an embodiment, a secret key called diversification key DK can be provisioned in factory for diversifying each of the communication apparatuses manufactured by an original equipment manufacturer (OEM). Therefore, the subscription modules control and memorizes the one-time secret key Kn while the communication apparatus memorizes the diversification key DK. In that case, the one-time secret key Kn is derived from the random challenge RAND and the diversification key DK. This complicates the generation of a fraudulent device as both the communication apparatus and the subscription module must be cloned. The fraudster will need an access to the communication apparatus.

Figure 2:
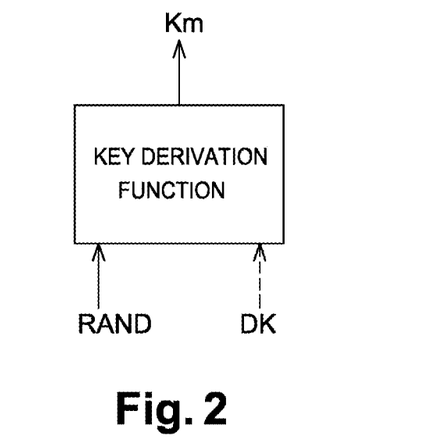
FIG. 2 schematically represents the process of generating a one-time secret key Kn.

FIG. 2 schematically represents the process of generating a one-time secret key Kn.

The one-time secret key Kn is generated after a successful authentication by the subscription module thanks to a key derivation function. It uses the random challenge RAND that has been used for said successful authentication. A diversification key DK memorized in the communication apparatus embedding the subscription module can also be used as an input.

The key derivation function can be implemented using well known technologies such as HMAC Key Derivation Function (HKDF), KDF1 or KDF2 as defined in ISO/IEC 18033 specification.

Figure 3:
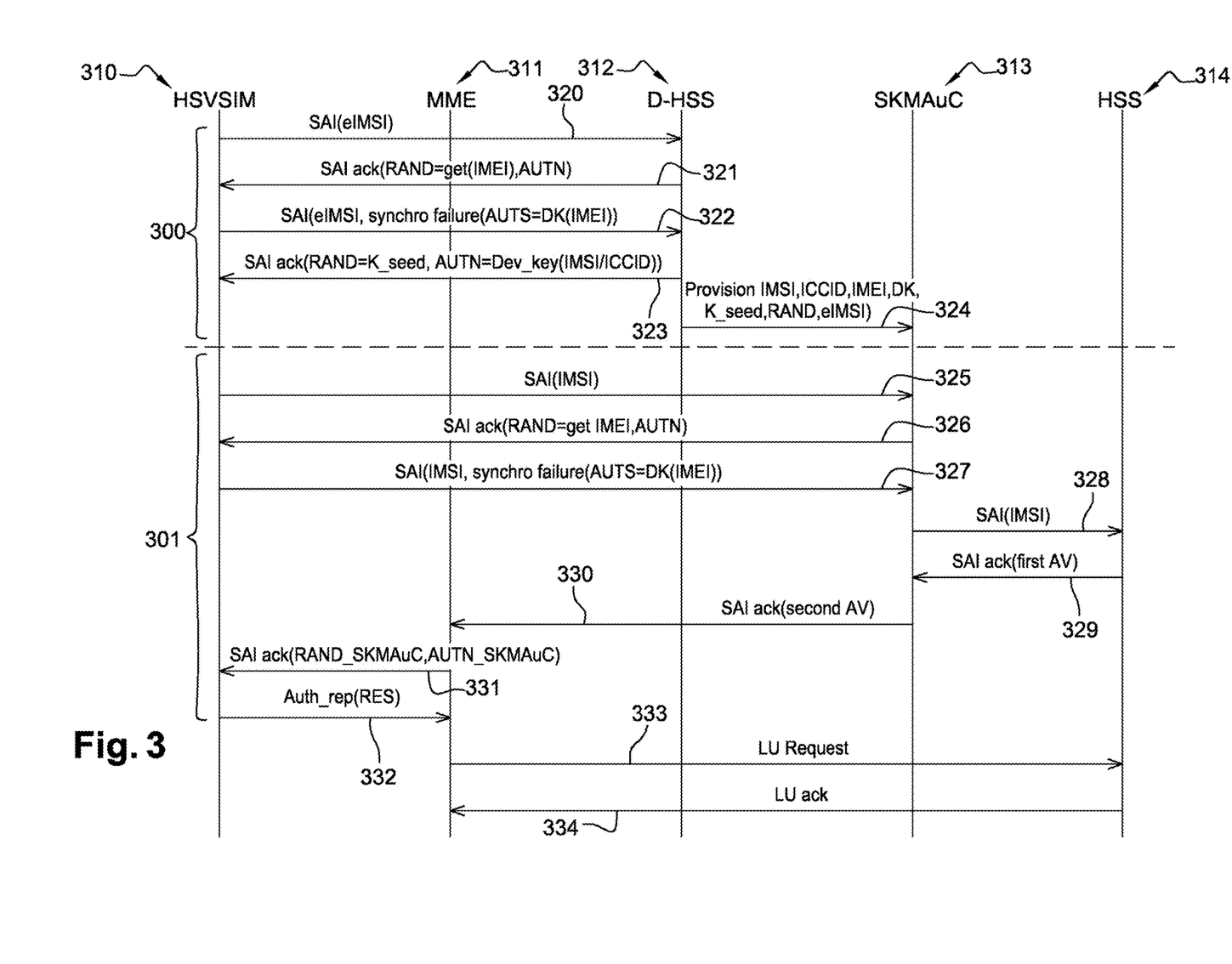
FIG. 3 is a sequence diagram illustrating an example of authentication mechanism with using a one-time secret key generation according to the invention.

FIG. 3 is a sequence diagram illustrating an example of authentication mechanism with using a one-time secret key generation according to the invention.

According to this example, a subscription module is implemented in software by a communication device as a virtual SIM and designated in the sequel as Hyper Secure Virtual SIM (HSVSIM). However, a similar mechanism is also applicable to eUICC or traditional SIM cards. The authentication is based on the MILENAGE algorithm as specified in the 3GPP technical specifications TS 35.205 and 3GPP TS 35.206. However, this is for exemplary purpose and the skilled person will understand that the invention is also application to other authentication and key generation algorithm. An alternative to the MILENAGE technology with which the present invention is applicable is the Tuak algorihm set described in the 3GPP technical specification 3GPP TS 35.233.

According to this example, the Hyper Secure Virtual SIM 310 can be diversified remotely with a set of credentials used for the first attachment to the targeted operator network. This can be performed during an initialization phase 300 during which a dialog between the connected apparatus embedding the HSVSIM 310 and a discovery server D-HSS 312. A protocol can be set-up based on existing message for the initialization phase to be carried out without the connected apparatus to be attached to a wireless network operated by a mobile network operator (MNO). The objective of this phase is to diversify remotely the Hyper Secure Virtual SIM with credentials that will be used only for the first attachment to the targeted operator network.

In this example, the subscription module is not provisioned with the credentials needed to access to the network of an operator. The provisioning is done during the initialization phase. However, some alternatives can be considered by the skilled person. For example the HSVSIM can be initially provisioned with a bootstrap profile. In that case, the initialization phase is not needed.

The initialization phase is based on using a D-HSS server in order to configure the Hyper Secure Virtual SIM 310 for it to attach to a pending network operator. A pending network operator is a mobile network operator making a subscription available for a user, called the subscriber, to access its network with a communication apparatus.

This initialization phase does not attach the device to the network comprising the D-HSS. Only the first messages "send authentication info" (SAI) 320-323 are exchanged with the Discovery server (D-HSS). This initial phase is such that the subscriber not charged by any mobile network operator.

During the initial phase, the HSVSIM 310 can be configured through commands and encrypted data provided using existing fields that are normally used to transmit the RAND, AUTN and AUTS parameters. These fields are diverted so that the Hyper Secure Virtual SIM 310 is provisioned for example with an ICCID, an IMSI, an OTA key, a PUK, a PUK2, a PIN, a PIN2 and an OPc. In other words, the Hyper Secure Virtual SIM 310 is configured to analyze the RAND and/or AUTN fields of a standardized SAI message which use is diverted such that other type of parameters can be exchanged. It also enables the HSVSIM 310 to execute a command aiming at starting a dialog between the communication device and the network using a random ephemeral eIMSI in order to transmit its International Mobile Equipment Identity (IMEI) using for example the AUTS field of an SAI message 322.

The IMEI is the identifier of the communication apparatus embedding the HSVSIM.

According to an embodiment of the invention, the IMEI can be paired with a Diversified Key (DK) in the communication apparatus. The same pairing information is provisioned in the D-HSS 312. During this initialization phase the Hyper Secure Virtual SIM 310 retrieves from the D-HSS 312 a set of data elements, for example an ICCID, a permanent IMSI, a PUK, a PUK2, an OTA key. These data elements are encrypted or diversified with the Diversified Key (DK).

The D-HSS 312 can be provisioned with a set of credentials corresponding to a subscription and associated to the IMEI of the communication apparatus embedding the HSVSIM 310.

The IMEI received 322 by the D-HSS server 312 is compared with the IMEI values memorized within the D-HSS 312 in order to retrieve a permanent IMSI allocated for this communication apparatus.

Then, the HSVSIM is provided 323 with the IMSI and the integrated circuit card identifier (ICCID) enciphered using the diversification key DK. According to an example, the D-HSS server 312 also provides a random number K_seed that can be used by the HSVSIM 310 and on the network side to determine the initial version of the subscriber secret key.

Once the HSVSIM 310 is initialized which means that it is provisioned with the credentials and parameters of the subscription allocated by the network, a refresh command is launched on the Hyper Secure Virtual SIM for and it switches to the new subscription associated to the permanent IMSI.

At this stage, the initial version of the subscriber key K as well as an operator code OP use by the MILENAGE algorithm can be calculated by both the network and the HSVSIM.

The MILENAGE algorithm uses an operator code OP which is a 128-bit Operator Variant Algorithm Configuration Field that is a component of the functions f1, f1*, f2, f3, f4, f5 and f5*.

According to an aspect of the invention, this operator code OP is defined per subscriber module and not per mobile network operator (MNO) as it is usually done in the prior art. By doing so, the mobile network operator (MNO) is advantageously protected against hacking.

As a reminder, the OPc is a 128-bit value derived from OP and from the subscriber key K. It is used within the computation of the functions of the MILENAGE algorithm. Only OPc is used in subsequent computations and not OP.

If a hacker has access to the OPc and the K key, he will be able to get the OP code. However, when the OP code is different for every subscriber, the hacked OP code cannot be reused for spying the other subscribers.

According to an aspect of the invention, the OP code is diversified by the ephemeral IMSI (eIMSI), the seed K_seed, the IMEI and the diversification key DK. The Hyper Secure Virtual SIM 310 computes the OP code using a key derivation function $fo(\ )$. The derivation of OP can be expressed as:

$$OP = fo(eIMSI, RAND, DK, IMEI)$$

One essential aspect of the invention is that the key K changes after each successful authentication.

As a reminder, K is a subscriber key that is an input to the functions f1, f1*, f2, f3, f4, f5 and f5* of the MILENAGE algorithm. According to the invention, the subscriber key is valid per Authentication instead of per UICC. The subscriber secret key is therefore a one-time secret key. The Hyper Secured Virtual SIM 310 uses a key derivation function $fk(\ )$ to compute the initial version of the subscriber key noted K_0. For that purpose, one or several input parameters can be used such as:

ephemeral IMSI (eIMSI) used during the initialization phase;
the seed K_seed;
the diversification key DK;
the IMEI stored in the communication apparatus.

The initial value K_0 of the subscription keys can therefore be expressed as follow:

$$K\_0 = fk(eIMSI, K\_Seed, DK, IMEI)$$

According to this example, the D-HSS 312 also sends securely 324 the data elements associated to the subscription are transmitted to a server 313 called SKMAuC. The SKMAuC server 313 is a specific authentication center (AuC) behaving as a proxy server for the communication apparatuses embedding a subscriber module handling a one-time subscription key. The data elements associated to the subscription are all or part of IMSI, IMEI, DK, eIMSI and K_Seed depending of the implementation. For example, if K_Seed is not needed to derive K_0, it is not transmitted to the SKMAuC 313 server.

The initial state (at beginning of the initialization phase) and the final state (at the end of the initialization phase) are provided below for the HSVSIM 310, its associated communication apparatus and the SKMAuC server 313.

Initial state of the communication apparatus:
IMEI
DK
Initial state of the Hyper Secure Virtual SIM:
eIMSI
Final state of the communication apparatus:
IMEI
DK
Final state of the Hyper Secure Virtual SIM:
IMSI
ICCID
K_0
OP
PIN/PUK/PUK2 diversified
RI/CI
Final state of the SKMAuC server:
IMSI
IMEI
ICCID
eIMSI
RAND
DK The initialization phase is followed by one or several authentication phase 301.

All attachment requests for these communication apparatuses are routed to the SKMAuC 313 based for example on a predefined IMSI range. In other words, the permanent IMSI that is attributed to the HSVSIM 310 is chosen in range that is identified by the network as associated to the SKMAuC server 313. As a consequence, the mobile network will route the attachment requests towards the SKMAuC server 131.

Once an attachment request is sent by the communication apparatus and that the corresponding SAI message 325 comprising the permanent IMSI is received by the SKMAuC server 313, a command is transmitted 326 to the HSVSIM 310 in an SAI acknowledgement message. More precisely, the use of the RAND field carried by this SAI acknowledgment message is diverted for it to be interpreted as a request to get the IMEI of the communication apparatus.

Once this command is received, the HSVSIM 310 transmits the IMEI to the SKMAuC using a SAI synchronization error message 327. For that purpose, the use of the AUTS field can be diverted in order to carry the IMEI. According to an example, the IMEI can be transmitted enciphered using the diversification key DK. As this secret key is also known by the SKMAuC server 313, it will be able to decipher it.

The SKMAuC server 313 then checks the pairing between the permanent IMSI and the received IMEI. The SKMAuC server 313 stores or has access to a database recording the one or several IMEI which are associated to the IMSI identifiers used by the mobile network operator. According to an example, this database can be localized in the D-HSS server 312.

At this stage, and if the correspondence between the received IMEI and the permanent IMSI previously transmitted 325 is not correctly verified, the SKMAuC server 313 rejects the attachment request. The requesting subscriber module is in that case identified as a clone and the attachment request is rejected.

In case the received IMEI is correctly associated to the IMSI, the attachment request is transferred 328 to the HSS server 314. For that purpose, a SAI message comprising the IMSI can be used.

The HSS server 314 then transmits 329 a first authentication vector to the SKMAuC server 313 using for example an SAI acknowledgment message. An authentication vector is a set of parameters which provides authentication data that enables to engage the mobile network in an authentication procedure with a particular subscriber.

According to this example, the first authentication vector comprises:
A random challenge RAND_HSS
An authentication token AUTN_HSS
A cipher key CK_HSS
An integrity key IK_HSS
An expected response XRES_HSS The notation "X_HSS" indicates that a given parameter X is provided by the HSS server 314.

The SKMAuC server 313 extracts the authentication management field AMF_HSS and the sequence number SQN_HSS from the SAI acknowledgment message 329, or uses SMKAuC AMF and SQN.

According to an example, the SKMAuC server 313 runs the MILENAGE algorithm to rebuild a second authentication vector based on the random challenge RAND_HSS and the one-time secret key Kn:
an expected response: XRES_SKMAuC=f2(Kn, RAND_HSS)
a cipher key: CK_SKMAuC=f3(Kn, RAND_HSS)
an integrity key: IK_SKMAuC=f4(Kn, RAND_HSS)
an authentication token: AUTN_SKMAuC=(SQN_SK-MAuC ⊕f5 (RAND_HSS, Kn)||AMF_SKMAuC||f1 (Kn, RAND_HSS, SQN_SKMAuC, AMF_SKMAuC)
a key access security management entries K_ASME (for LTE network):
Key=CK_SKMAuC||IK_SKMAuC
S=FC(0x10)||SN Id||Length of SN id||SQN_SKMAuC ⊕ AK_SKMAuC||length of SQN_SKMAuC ⊕AK_SK-MAuC
K_ASME=HMAC-SHA-256 (Key, S)

The notation "X_SKMAuC" indicates that a given parameter X is provided by the SKMAuC server 313.

Kn refers to the current version of the subscriber key as maintained by the SKMAuC server 313.

The f1, f2, f3, f4 and f5 are functions which are part of the MILENAGE algorithm as defined in the 3GPP technical specifications TS 35.205 and 3GPP TS 35.206.

The SKMAuC server 313 sends the second authentication vector in a SAI message 330 to the mobility management entity (MME) 311 of the mobile network operator.

The mobility management entity (MME) 311 then transmits 331 RAND_SKMAuC and AUTN_SKMAuC to the Hyper Secure Virtual SIM 310 for it to apply the standard MILENAGE algorithm.

Once the MILENAGE is completed, the results obtained RES is transmitted 332 to the MME 311 for the network and the device to be authenticated.

The Hyper Secure Virtual SIM 310 then determines the next version of the subscriber secret key Kn.

As an example, Kn can be obtained by applying a key derivation function Fk as follow:

$$Kn=Fk(eIMSI, RAND, DK, IMEI)$$

The MME 311 then checks if RES and XRES are identical. If this is the case, the authentication process is successful and a location update message 333 is transmitted by the HSVSIM 310 to the SKMAuC 313 which handovers to the HSS server 314 of the mobile network operator the location update procedure in order to complete the attachment of the communication apparatus.

The SKMAuC server 313 then computes and stores the next version Kn of the subscription secret key for being synchronized the with the HSVSIM 310 using the same key derivation function Fk with the same input parameters.

The same mechanism can then be applied for the next processing the next authentication request.

The invention claimed is:

1. A method for updating a one-time secret key Kn maintained in a subscription module implemented in a communication apparatus, a wireless communication network maintaining an identical version of said one-time secret key Kn and configured to determine a result XRES expected from the communication apparatus when an authentication function is applied by the subscription module using a random number and said one-time secret key Kn as an input, the method comprising the following steps:
receiving from the communication network an authentication request message containing at least a random number RANDn;
determining by the subscription module a result RES by applying the authentication function using the random number RANDn and the secret key Kn as inputs;
transmitting said result RES to the communication network for it to be compared with the expected result XRES determined by the communication network using the random number RANDn and the corresponding version of the secret key Kn, the subscriber being authenticated if said first and second results are matching;
after each successful authentication of the subscriber, updating the one-time secret key Kn by replacing its current version with a new version obtained by applying a first key derivation function using the random number RANDn as an input, the updated version of the one-time secret key Kn being used by the subscription module for processing a subsequent authentication request, the same update being carried out by a server accessible or part of the wireless communication network in order to maintain an identical version of the one-time secret key Kn.

2. The method according to claim 1, wherein a secret key, called diversification key DK, is memorized by the communication apparatus and used as an input by the first key derivation function in order to determine the one-time secret key Kn.

3. The method according to claim 1, wherein an identifier of the communication apparatus such as the IMEI is memorized by the communication apparatus and used as an input by the first key derivation function in order to determine the one-time secret key Kn.

4. The method according to claim 1, wherein an identifier of the subscriber of IMSI type memorized by the subscription module and used as an input by the first key derivation function in order to determine the one-time secret key Kn.

5. The method according to claim 1, wherein the initial version K_0 of the one-time secret key Kn is initialized using a second key derivation function using as an input a random seed received from and determined by the communication network.

6. A subscription module implemented in a communication apparatus configured to maintain and update a one-time secret key Kn, a wireless communication network maintaining an identical version of said one-time secret key Kn and configured to determine a result XRES expected from the communication apparatus when an authentication function is applied by the subscription module using a random number and said one-time secret key Kn as an input, the subscription module being further configure to:
  receive from the communication network an authentication request message (330, 331) containing at least a random number RANDn;
  determine a result RES by applying the authentication function using the random number RANDn and the one-time secret key Kn as inputs;
  transmit said result RES to the communication network for it to be compared with the expected result XRES determined by the communication network using the random number RANDn and the corresponding version of the one-time secret key Kn, the subscriber being authenticated if said first and second results are matching;
  update the one-time secret key Kn after each successful authentication of the subscriber by replacing its current version with a new version obtained by applying a first key derivation function using the random number RANDn as an input, the updated version of the one-time secret key Kn being used by the subscription module for processing a subsequent authentication request, the same update being carried out by a server accessible or part of the communication network in order to maintain an identical version of the secret key Kn.

7. The subscription module according to claim 6 being an embedded universal integrated-circuit card.

8. The subscription module according to claim 6 being a universal integrated-circuit card.

9. The subscription module according to claim 6 being implemented in a software program localized in the communication apparatus.

10. A communication apparatus comprising a subscription module configured to maintain and update a one-time secret key Kn, a wireless communication network maintaining an identical version of said one-time secret key Kn and configured to determine a result XRES expected from the communication apparatus when an authentication function is applied by the subscription module using a random number and said one-time secret key Kn as an input, the subscription module being further configured to:
  receive from the communication network an authentication request message (330, 331) containing at least a random number RANDn;
  determine a result RES by applying the authentication function using the random number RANDn and the one-time secret key Kn as inputs;
  transmit said result RES to the communication network for it to be compared with the expected result XRES determined by the communication network using the random number RANDn and the corresponding version of the one-time secret key Kn, the subscriber being authenticated if said first and second results are matching;
  update the one-time secret key Kn after each successful authentication of the subscriber by replacing its current version with a new version obtained by applying a first key derivation function using the random number RANDn as an input, the updated version of the one-time secret key Kn being used by the subscription module for processing a subsequent authentication request, the same update being carried out by a server accessible or part of the communication network in order to maintain an identical version of the secret key Kn.

11. A computer program product stored in a computer and comprising instructions which, when the program is executed by athe computer, cause the computer to update a one-time secret key Kn maintained in a subscription module implemented in a communication apparatus, a wireless communication network maintaining an identical version of said one-time secret key Kn and configured to determine a result XRES expected from the communication apparatus when an authentication function is applied by the subscription module using a random number and said one-time secret key Kn as an input, the instructions comprising instructions to cause the computer to:
  receive from the communication network an authentication request message containing at least a random number RANDn;
  determine by the subscription module a result RES by applying the authentication function using the random number RANDn and the secret key Kn as inputs;
  transmit said result RES to the communication network for it to be compared with the expected result XRES determined by the communication network using the random number RANDn and the corresponding version of the secret key Kn, the subscriber being authenticated if said first and second results are matching;
  after each successful authentication of the subscriber, update the one-time secret key Kn by replacing its current version with a new version obtained by applying a first key derivation function using the random number RANDn as an input, the updated version of the one-time secret key Kn being used by the subscription module for processing a subsequent authentication request, the same update being carried out by a server accessible or part of the wireless communication network in order to maintain an identical version of the one-time secret key Kn.

12. A computer-readable storage medium comprising instructions which, when the program is executed by a computer, cause the computer to update a one-time secret key Kn maintained in a subscription module implemented in a communication apparatus, a wireless communication network maintaining an identical version of said one-time secret key Kn and configured to determine a result XRES expected from the communication apparatus when an authentication function is applied by the subscription module using a random number and said one-time secret key Kn as an input, the instructions comprising instructions to cause the computer to:
  receive from the communication network an authentication request message containing at least a random number RANDn;
  determine by the subscription module a result RES by applying the authentication function using the random number RANDn and the secret key Kn as inputs;
  transmit said result RES to the communication network for it to be compared with the expected result XRES determined by the communication network using the random number RANDn and the corresponding version of the secret key Kn, the subscriber being authenticated if said first and second results are matching;
  after each successful authentication of the subscriber, update the one-time secret key Kn by replacing its current version with a new version obtained by applying a first key derivation function using the random number RANDn as an input, the updated version of the one-time secret key Kn being used by the subscription module for processing a subsequent authentication request, the same update being carried out by a server accessible or part of the wireless communication network in order to maintain an identical version of the one-time secret key K.

\* \* \* \* \*